US006826824B2

(12) United States Patent
Hiroyuki et al.

(10) Patent No.: US 6,826,824 B2
(45) Date of Patent: Dec. 7, 2004

(54) EMBEDDED MAGNET TYPE ROTOR AND FILLING OF THE SAME

(75) Inventors: Ishihara Hiroyuki, Shizuoka (JP); Kazuyoshi Kaneko, Shizuoka (JP); Shinya Naito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/916,948

(22) Filed: Jul. 27, 2001

(65) Prior Publication Data

US 2002/0047409 A1 Apr. 25, 2002

(30) Foreign Application Priority Data

Jul. 27, 2000 (JP) ........................................ 2000-226285

(51) Int. Cl.[7] .......................... H02K 15/16; H02K 15/02
(52) U.S. Cl. ........................... 29/598; 29/596; 310/254; 310/154; 310/156
(58) Field of Search .......................... 29/296, 598, 609, 29/607, 732, 606, 604; 310/254, 154, 156, 46, 152, 154.03, 154.11, 154.21, 154.29, 156.05, 156.38, 156.82

(56) References Cited

U.S. PATENT DOCUMENTS

| | | | | |
|---|---|---|---|---|
| 3,762,847 A | * | 10/1973 | Deuter et al. | ................ 425/125 |
| 3,782,212 A | | 1/1974 | Ward, III | |
| 4,464,826 A | * | 8/1984 | Bair | ............................. 29/593 |

(List continued on next page.)

FOREIGN PATENT DOCUMENTS

| | | |
|---|---|---|
| EP | 0 746 079 A2 | 12/1996 |
| EP | 0 905 858 A1 | 3/1999 |
| JP | 08 336247 A | 12/1996 |
| JP | 08336269 A2 | 12/1996 |
| JP | 08-336269 | 12/1996 |
| JP | 09 023598 A | 1/1997 |
| JP | 09266646 A2 | 10/1997 |
| JP | 10271722 A2 | 10/1998 |
| JP | 10-271722 | 10/1998 |

(List continued on next page.)

OTHER PUBLICATIONS

Hiroshi Murakami, et al., Highly Efficient Double IPM (Interior Permanent Magnet) Motor, *Matsushita Technical Jounal*, vol. 44, No. 2, Apr. 1998, pp. 37–42. (Reference with English abstract and drawing captions).
Fumitoshi Yamashita, et al., Magnetic Stability of Exchange Spring Magnets and Application to Direct Molding Magnet Rotor, *Matsushita Technical Journal*, vol. 44, No. 2, Apr. 1998, pp. 78–86. (Reference in Japanese with English abstract and drawing captions).
Co–pending patent application: Ser. No. 09/882,370, filed Jun. 15, 2001, entitled Permanent Magnet Rotor and Method of Making the Same, in the name of Shinya Naito et al. and assigned to Yamaha Hatsudoki Kabushiki Kaisha.
Copy of European Search Report dated Dec. 19, 2003.

*Primary Examiner*—Peter Vo
*Assistant Examiner*—Stephen Kenny
(74) *Attorney, Agent, or Firm*—Knobbe, Martens, Olson & Bear, LLP (57) ABSTRACT

A system and method are used to assemble and fill an embedded magnet type rotor. The system and method prevent rotation of the rotor core within a manufacturing device as the rotor core is being filled and the embedded magnets are magnetically orientated. The embedded magnet type rotor is made by a process in which resinous magnet is filled in slits provided in a rotor core. In one embodiment, a recessed portion of the core in a shaft hole is engageable with a projecting portion of a core pin of a metallic mold for use in filling the resinous magnet to prevent rotation of the core. Other positioning devices are also used to prevent rotation.

10 Claims, 5 Drawing Sheets

U.S. PATENT DOCUMENTS

| | | | | |
|---|---|---|---|---|
| 5,144,735 A | * | 9/1992 | Stark | 29/732 |
| 5,801,478 A | | 9/1998 | Nashiki | |
| 5,945,760 A | | 8/1999 | Honda et al. | 310/156 |
| 5,996,209 A | * | 12/1999 | Molnar et al. | 29/596 |
| 6,047,460 A | * | 4/2000 | Nagate et al. | 29/598 |
| 6,084,496 A | | 7/2000 | Asano et al. | 335/284 |
| 6,225,725 B1 | * | 5/2001 | Itoh et al. | 310/254 |
| 2002/0041127 A1 | | 4/2002 | Naito et al. | 310/156.07 |

FOREIGN PATENT DOCUMENTS

| | | |
|---|---|---|
| JP | 10285881 | 10/1998 |
| JP | 11 103547 A | 4/1999 |
| JP | 11206075 A2 | 7/1999 |
| JP | 11262205 A2 | 9/1999 |
| JP | 2000166190 | 6/2000 |
| JP | 2001028853 | 1/2001 |

* cited by examiner

EMBEDDED MAGNET TYPE ROTOR AND FILLING OF THE SAME

BACKGROUND OF THE INVENTION

1. Field of the Invention

This invention relates to an embedded magnet type rotor for use in a rotary electric device such as an electric motor, a generator, or the like, and particularly relates to an embedded magnet type rotor made by a process in which resinous magnet is filled in slits provided in a rotor core such as a laminated iron core, the core having a shape capable of preventing rotation of the rotor core within a manufacturing device, and further relates to a filling method suited for manufacturing the same.

2. Description of the Related Art

Heretofore, an embedded magnet type rotor has been known in which anisotropic resinous magnet is filled in arcuate slits provided in a cylindrical rotor core, circumferentially in regular intervals.

In manufacturing the conventional embedded magnet type rotor, a metallic mold, comprising an upper die and a lower die, is used for filling the resinous magnet. The lower die has permanent magnets disposed along the outside circumference of the rotor core at intervals the same as those of the slits. Ferromagnetic materials are disposed between the permanent magnets. The upper die is placed on the top of the lower die and has gates through which the resinous magnet is filled in the slits.

The rotor core is loaded on the lower die with ends of the arcuate slits directed toward the magnets. Resinous magnet material is filled in the slits while being magnetically orientated. Then, the filled resinous magnet is magnetized using a magnetizing device.

However, an embedded magnet type rotor has magnetic saliency. Thus, in the conventional embedded magnet type rotor, a rotation force is exerted on the rotor core loaded on the metallic mold due to saliency of the magnets of the metallic mold and the rotor core. This force may cause rotation of the rotor core within the metallic mold with the result that the gates of the upper die and the slits of the rotor core are displaced. Therefore, the flow of the resinous magnet in the slits may change during filling, which may result in defective filling of the resinous magnet in the slits.

Even if the resinous magnet can be filled in the slits without trouble, displacement of the rotor core from the initial position during loading will prevent proper orientation of the resinous magnet, resulting in a high rate of misorientation. In addition, reluctance torque due to a magnetization current is produced in a magnetizing process. The reluctance torque may cause rotation of the rotor core within the magnetizing device, which may result in a high rate of defective magnetization.

The problem in magnetization is not limited to anisotropic resinous magnet, but the same trouble is found in isotropic resinous magnet as well.

SUMMARY OF THE INVENTION

In view of the foregoing problem, a need existed for an embedded magnet type rotor capable of preventing rotation of the rotor core within a manufacturing device.

One aspect of embodiments of the present invention is an embedded magnet type rotor made by a process in which resinous magnet is filled in slits provided in a rotor core. An inside circumferential surface of a shaft hole formed in the rotor core includes a rotor core side fitting section that is engageable with a manufacturing device side fitting section formed in a manufacturing device for use in an orientating process or a magnetizing process of the resinous magnet.

Another aspect of embodiments of the present invention is an embedded magnet type rotor made by a process in which resinous magnet is filled in slits provided in a rotor core. An outside circumferential surface of the rotor core is provided with a rotor core side fitting section engageable with a manufacturing device side fitting section formed in a manufacturing device for use in an orientating process or a magnetizing process of the resinous magnet.

In preferred embodiments in accordance with the foregoing aspects of the present invention, the rotor core side fitting section is engaged with the manufacturing device side fitting section so that rotation of the rotor core within the manufacturing device can be prevented. Therefore, the resinous magnet can be filled in the slits without trouble, and the resinous magnet can be orientated and magnetized reliably. This process results in a decreased rate of defective cores.

In particularly preferred embodiments in accordance with the foregoing aspects of the present invention, a recessed portion or a projecting portion may be provided as the rotor core side fitting section. The recessed portion is advantageously a groove that runs from one end of the rotor core to the middle thereof or that runs from one end to the other end of the rotor core. When a recessed portion is provided as the rotor core side fitting section, the manufacturing device side fitting section may be provided with a projecting portion engageable with the recessed portion of the rotor core. For example, the projecting portion of the fitting section may comprise a rib extending from one end of the rotor core to the middle thereof or extending from one end to the other end of the rotor core. Preferably, the rib corresponds to the shape of the groove of the rotor core. Alternatively, the projecting portion may be a projection adapted to be protruded within the groove of the rotor core.

Conversely, the rotor core side fitting section may include the projecting portion, and the manufacturing device side fitting section may include the recessed portion.

In alternative embodiments of the present invention, the recessed portion or the projecting portion may be provided as the rotor core side fitting section. In particular embodiments, the recessed portion may be a hole. Alternatively, the recessed portion may be a groove that runs from the shaft hole of the rotor core to the outside circumference thereof. When the recessed portion is provided as the rotor core side fitting section, the manufacturing device side fitting section is advantageously provided with a projecting portion engageable with the recessed portion of the rotor core. For example, the projecting portion may be a projection, or the projecting portion may be a rib that extends from the shaft hole of the rotor core to the outside circumference thereof. Alternatively, the groove may be provided as the rotor core side fitting section, and the projection projecting within the groove may be provided as the manufacturing device side fitting section. Further, by utilizing the slits provided in the rotor core, projecting portions engageable with the slits may be provided on the manufacturing device side.

Furthermore, conversely, a projecting portion may be provided as the rotor core side fitting section, and a recessed portion as the manufacturing side fitting section.

Another aspect of embodiments of the present invention is an embedded magnet type rotor made by a process in which resinous magnet is filled in slits provided in a rotor core. At least one of the end faces of the rotor core is provided with a rotor core side fitting section engageable with a manufacturing device side fitting section formed in a manufacturing device for use in an orientating process or a magnetizing process of said resinous magnet.

Another aspect of embodiments of the present invention is an embedded magnet type rotor made by a process in which resinous magnet is filled in slits provided in a rotor core. The rotor core is provided with a shaft. At least one end of the shaft is provided with a rotor core side fitting section engageable with a manufacturing device side fitting section formed in a manufacturing device for use in an orientating process or a magnetizing process of the resinous magnet.

In preferred embodiments in accordance with this aspect of the present invention, the shaft side fitting section of a shaft provided in the rotor core is engaged with the manufacturing device side fitting section so that rotation of the rotor core within the manufacturing device can be prevented. Therefore, the resinous magnet can be filled in the slits without trouble, and the resinous magnet can be orientated and magnetized reliably, resulting in a decreased rate of defective rotor cores.

Another aspect of embodiments of the present invention is a method of filling resinous magnet in slits provided in a rotor core. In accordance with the method, the resinous magnet is filled in the slits using ejector pins inserted in the slits.

Further, in accordance with this aspect of the invention, the resinous magnet can be filled in the slits with ejector pins inserted in the slits of the rotor core so that rotation of the rotor core within the manufacturing device can be prevented. Therefore, the resinous magnet can be filled in the slits without trouble, and the resinous magnet can be orientated reliably. This process results in a decreased rate of defective cores.

The ejector pin may have any shape, such as, for example, a bar-like shape. The ejector pin may also have an outside circumference having the same as the shape of the inside circumference of the slit.

The tips of the ejector pins may be inserted in the slits shallowly, or inserted to the middle thereof, or inserted deeply to the injection mouths of the slits. When the tips of the ejector pins are inserted in the slits to the middle thereof or inserted to the injection mouths of the slits at which the resinous magnet is injected, the ejector pins may be actively drawn out, or the ejector pins may be automatically retracted by injection pressure of the resinous magnet.

Another aspect of embodiments of the present invention is a method of filling resinous magnet in slits provided in a rotor core. Ejector pins are slidable along the inner surfaces of the spaces to be filled. The ejector pins are inserted in the spaces to the injection mouths thereof. Injection material is injected from the injection mouths, and the ejector pins are moved in the direction of retraction in association with injection of the injection material.

In preferred embodiments in accordance with this aspect of the invention, the ejector pins are slidable along the inner surfaces of the spaces to be filled and are inserted in the spaces to the injection mouths thereof so that no displacement of the mouths is produced. In this manner, the injection material can be filled in the spaces to be filled, without trouble.

In addition, the ejector pins can be moved in the direction of retraction in association with injection of the injection material. Such movement decreases pressure inside the die so that injection pressure of the resin can be kept low, thus preventing deformation of the die. The resin can be filled in the die substantially without voids. This results in an increased filling efficiency.

BRIEF DESCRIPTION OF THE DRAWINGS

FIGS. 1A and 1B illustrate views of an embedded magnet type rotor in accordance with a first preferred embodiment of the invention, wherein

FIGS. 2A and 2B illustrate views of a preferred embodiment of a metallic mold for use in manufacturing the embedded magnet type rotor of in accordance with embodiments of the invention, wherein

FIGS. 6A and 6B illustrated views of an embedded magnet type rotor in a mold in accordance with a fifth embodiment of the invention, wherein

DETAILED DESCRIPTION OF THE PREFERRED EMBODIMENTS

An embedded magnet type rotor according to a first embodiment of the invention will be described with reference to FIGS. 1A, 1B, 2A and 2B.

Figure 1A:
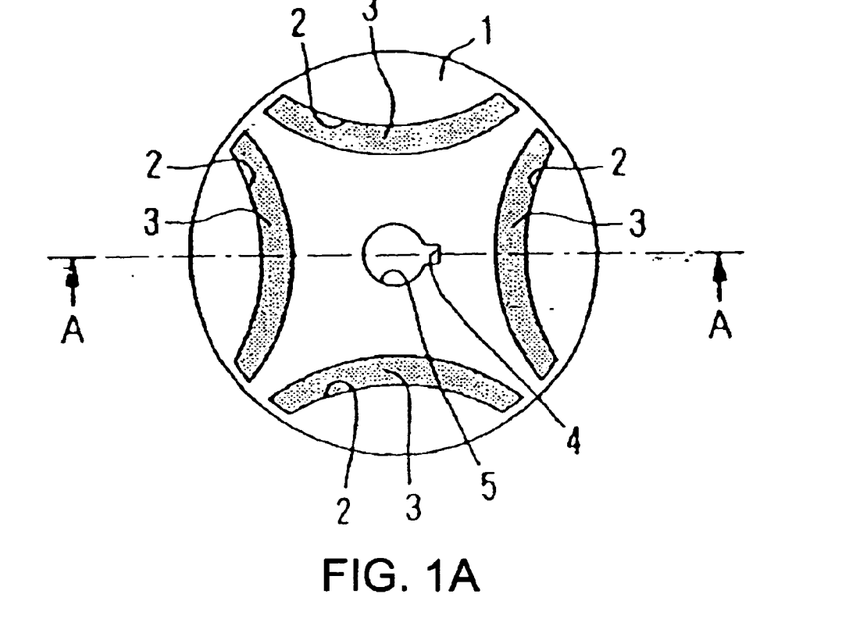
FIG. 1A is a plan view.
Figure 1B:
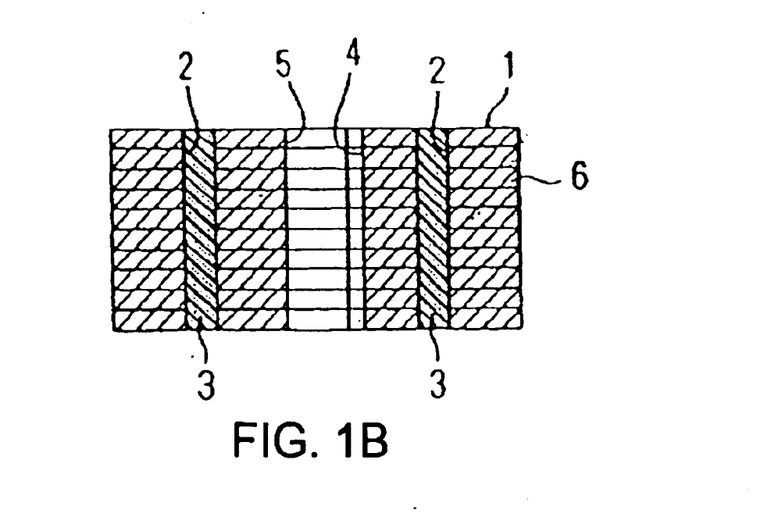
FIG. 1B is a sectional view taken along the line A—A of FIG. 1A.

FIGS. 1A and 1B illustrate views of a first embodiment of the embedded magnet type rotor according to the invention. FIG. 1A is a plan view, and FIG. 1B is a sectional view taken along the line A—A of FIG. 1B.

Figure 2A:
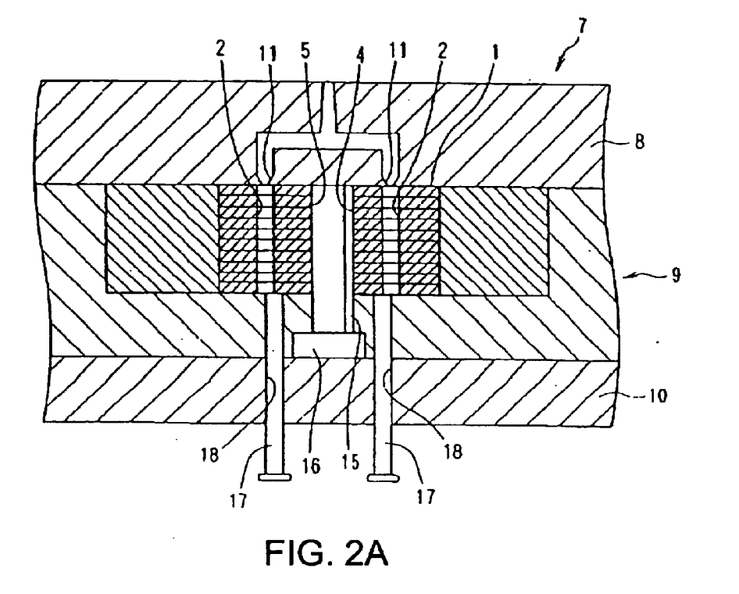
FIG. 2A is a sectional view taken along the line B—B of FIG. 2B with the upper die mounted.
Figure 2B:
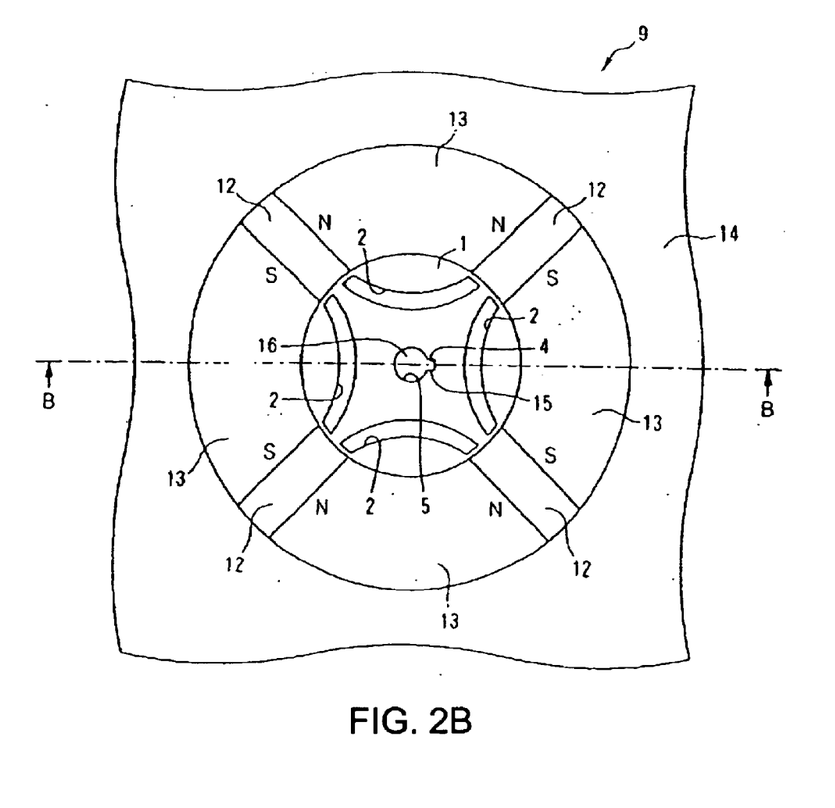
FIG. 2B is a plan view shown with the upper die removed.

FIGS. 2A and 2B illustrate views of a metallic mold for use in manufacturing the embedded magnet type rotor of this invention. FIG. 2B is a plan view with the upper die removed to show the top of the rotor. FIG. 2A is a sectional view taken along line B—B of FIG. 2B, but with the upper die mounted.

As shown in FIG. 1A, the embedded magnet type rotor in accordance with the first embodiment comprises a rotor core 1 having a plurality of slits 2. The slits 2 are filled with an anisotropic resinous magnet 3.

As shown in FIG. 1B, the rotor core 1 is formed of laminated electromagnetic steel plates 6. Each plate 6 has a disc-like shape. Each plate 6 has the slits 2 formed therein. Each plate 6 has a punched-out keyhole-like shaft hole 5 that includes a recess 4. When the plates 6 are stacked as shown in FIG. 1B, the rotor core 1 has a cylindrical shape, with the shaft hole 5 and the slits 2 therethrough in the axial direction.

Each slit 2 is formed in the shape of an arc. The slits 2 are positioned in the rotor core 1 circumferentially at regular intervals. The resinous magnet 3 is filled in the slits 2.

A metallic mold 7, shown in FIG. 2A is used to fill the slits 2 with the resinous magnet 3. The mold 7 comprises an upper die 8, an intermediate die 9, and a lower die 10.

The upper die 8 has a plurality of gates 11 through which the resinous magnet 3 is injected into the slits 2 of the rotor core 1. As further shown in FIG. 2B, the intermediate die 9 has a space (i.e., a cavity) at its center into which the rotor core 1 is loaded. The intermediate die 9 has permanent magnets 12 disposed along the outside circumference of the rotor core 1 when the rotor core 1 is loaded in the cavity. The permanent magnets 12 are disposed at intervals that correspond to the intervals at which the slits 2 are positioned. Ferromagnetic materials 13 are positioned between the permanent magnets 12. A nonmagnetic material 14 surrounds the permanent magnets 12 and the ferromagnetic materials 13.

As shown in FIG. 2A, a key-shaped core pin 16 is inserted into the intermediate die 9 from below. The core pin 16 enters the shaft hole 5 of the core 1. The core pin 16 includes a projecting portion 15 along an axial line of the core pin 16. The projecting portion 15 is engageable with the recessed portion 4 of the shaft hole 5 of the rotor core 1 and a corresponding recess in the intermediate die 9. Rotation of the rotor core 1 within the metallic mold 7 can thus be prevented. As shown in FIG. 2B, the rotor core 1 is held in place in the mold 7 with ends of the arcuate slits 2 directed toward the permanent magnets 12 for orientation and magnetization.

As shown in FIG. 2A, the lower die 10 is formed in the shape of a flat plate. The lower die 10 has a top that is adapted to support the upper die 8, the intermediate die 9, and the core pin 16.

The metallic mold 7 includes a plurality of pin holes 18 through which a corresponding plurality of ejector pins 17 can be inserted therein from below. The ejector pins 17 have tips that are abutted against the bottom of the rotor core 1 when the rotor core 1 is positioned in the intermediate die 9.

The metallic mold 7 is assembled as described above, the rotor core 1 is positioned in the intermediate die 9, and the resinous magnet 3 is injected into the slits 2 of the rotor core 1 while being magnetically orientated by the permanent magnets 12 in accordance with the procedure described below.

First, as shown in FIG. 2B, the core pin 16 is inserted in the shaft hole 5 of the rotor core 1 to secure the rotor core 1 in the intermediate die 9 with the ends of the arcuate slits 2 directed toward the permanent magnets 12 of the metallic mold 7. As shown in FIG. 2A, the tips of the ejector pins 17 are abutted against the bottom of the rotor core 1.

Then, the upper die 8 is placed on the top of the intermediate die 9. Thereafter, the resinous magnet 3 is injected into the slits 2 of the rotor core 1 from the gates 11 of the upper die 8 while being magnetically orientated by the permanent magnets 12 of the metallic mold 7.

After the resinous magnet 3 (shown in FIGS. 1A and 1B) injected into the slits 2 has been solidified, the upper die 8 is removed from the top of the intermediate die 9, and the rotor core 1 is pushed up with the ejector pins 17 to force the rotor core 1 out of the intermediate die 9.

As described above, as a result of magnetic orientation being performed with the projecting portion 15 of the core pin 16 fitted in the recessed portion 4 of the rotor core 1, rotation of the rotor core 1 within the metallic mold 7 is prevented, so that the resinous magnet 3 can be filled in the slits 2 without trouble, and so that the resinous magnet 3 filled in the slits 2 can be orientated reliably. This procedure provides a reduced rate of defective cores.

In the foregoing embodiment, the metallic mold 7 is exemplified as a manufacturing device used in a process in which the resinous magnet is filled while magnetically orientated. The manufacturing device may also be used in a process in which magnets embedded in a rotor core are magnetized, in which case, rotation of the rotor core 1 due to a magnetization current can also be prevented.

Figure 3:
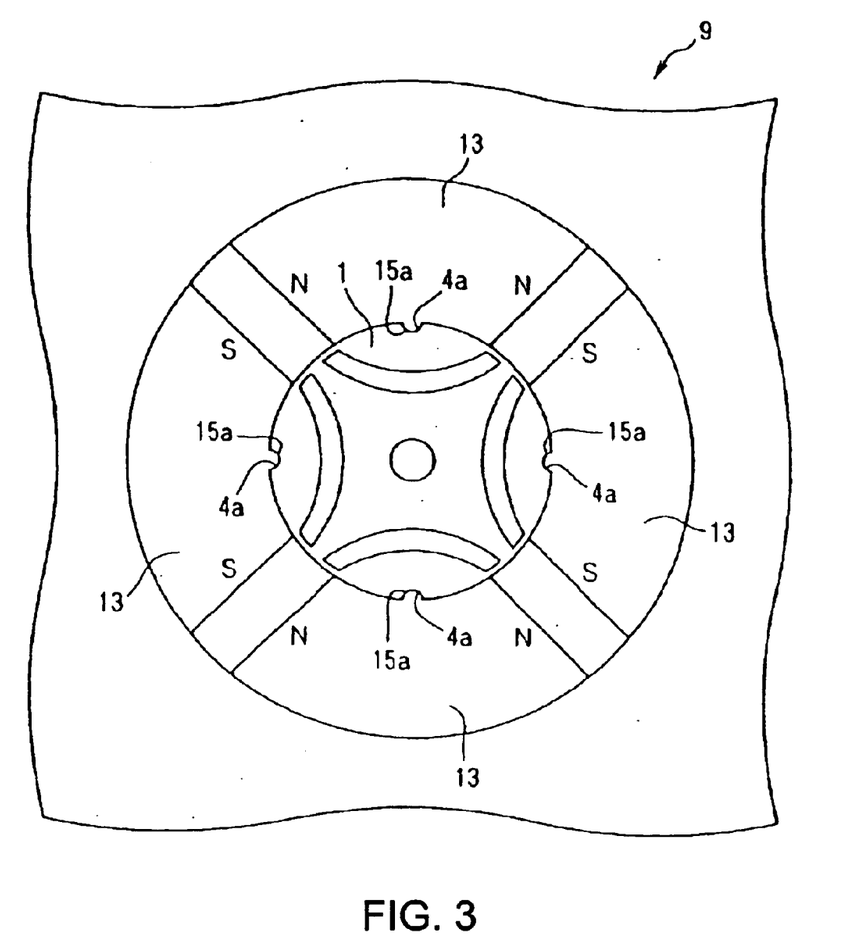
FIG. 3 illustrates a plan view of an embedded magnet type rotor in a mold in accordance with a second embodiment of the invention, the plan view being similar to the plan view of FIG. 2B.

FIG. 3 illustrates a plan view of an embedded magnet type rotor in accordance with a second embodiment of the invention. The plan view of FIG. 3 is similar to the plan view of FIG. 2B. In FIG. 3, like parts in common with parts in FIG. 2B are designated by like numerals.

As shown in FIG. 3, the second embodiment is different from the first embodiment in that the outside circumferential surface of the rotor core 1 includes a plurality of grooves 4a (i.e., recessed portions) that run from one end of the rotor core 1 to the other end. The inside circumferential surface of the ferromagnetic materials 13 of the intermediate die 9 include a corresponding plurality of ribs 15a that are engageable with the grooves 4a.

The function and the effect of this embodiment are the same as those of the first embodiment except that the grooves 4a and the ribs 15a replace the keying of the shaft hole 5 in FIGS. 2A and 2B.

Figure 4:
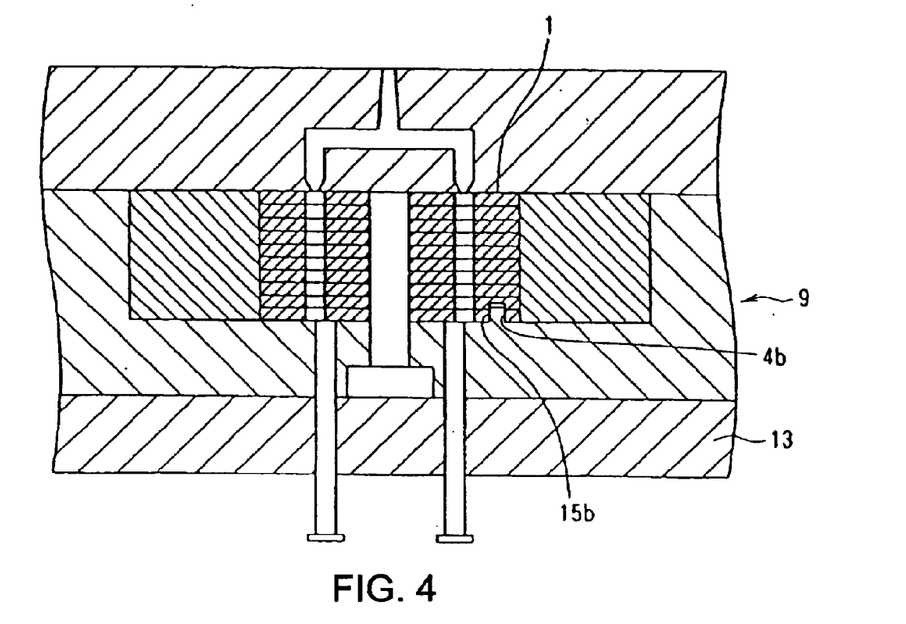
FIG. 4 illustrates a sectional view of an embedded magnet type rotor in a mold in accordance with a third embodiment of the invention, the sectional view being similar to the sectional view of FIG. 2A.

FIG. 4 illustrates a sectional view of an embedded magnet type rotor in accordance with a third embodiment of the invention. The sectional view of FIG. 4 is similar to the sectional view of FIG. 2A. In FIG. 4, like parts in common with parts in FIG. 2A are designated by like numerals.

As shown in FIG. 4, the third embodiment is different from the first embodiment in that one end of the rotor core 1 in FIG. 4 (e.g., the lower end in FIG. 4) includes a hole 4b as a recessed portion. The bottom of the cavity of the intermediate die 9 includes a projection 15b which engages the hole 4b to prevent the rotor core 1 from rotating within the intermediate die 9.

The function and the effect of the third embodiment are the same as those of the first embodiment.

Figure 5:
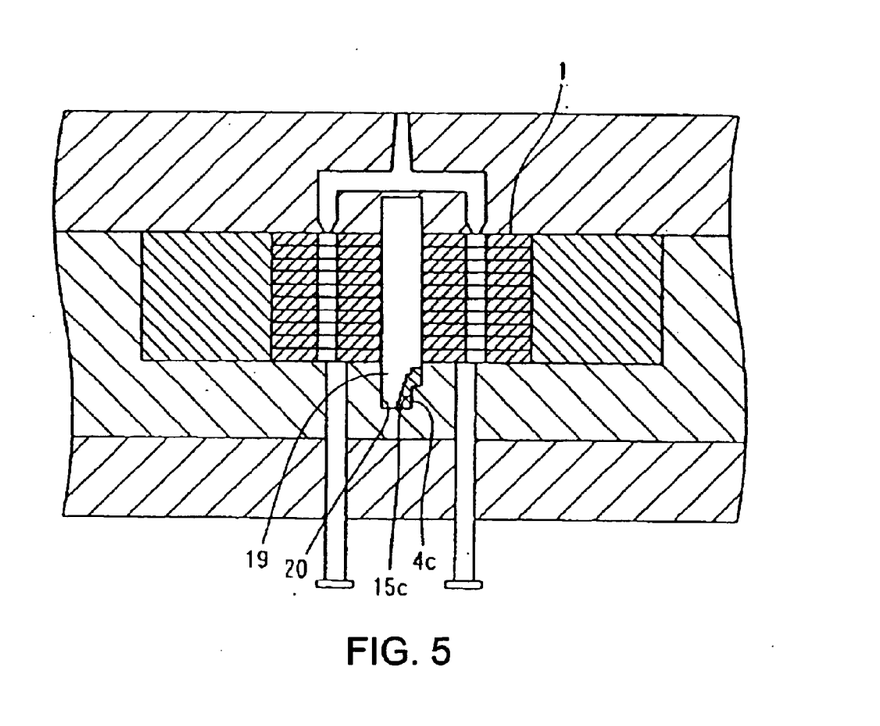
FIG. 5 illustrates a sectional view of an embedded magnet type rotor in a mold in accordance with a fourth embodiment of the invention, the sectional view being similar to the sectional view similar to FIG. 2A.

FIG. 5 illustrates a sectional view of an embedded magnet type rotor in accordance with a fourth embodiment of the invention. The sectional view of FIG. 5 is similar to the sectional view of FIG. 2A. In FIG. 5, like parts in common with parts in FIG. 2A are designated by like numerals.

As shown in FIG. 5, the fourth embodiment is different from those of the foregoing embodiments. Instead of including a recessed portion provided directly in the rotor core, the embodiment of FIG. 5 includes a shaft 19 that has a groove 4c at one end that forms a recessed portion. The shaft 19 is press fitted into the shaft hole 5 of the rotor core 1. The bottom of the cavity of the intermediate die 9 includes a hole 20 that has a rib 15c that is engageable with the groove 4c of the shaft 19.

Figure 6A:
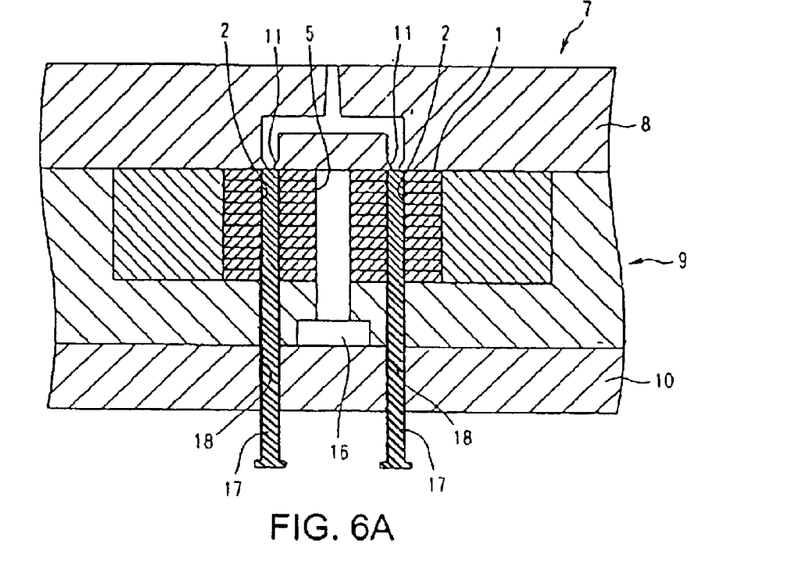
FIG. 6A is a sectional view taken along the line C—C of FIG. 6B with the upper die mounted.
Figure 6B:
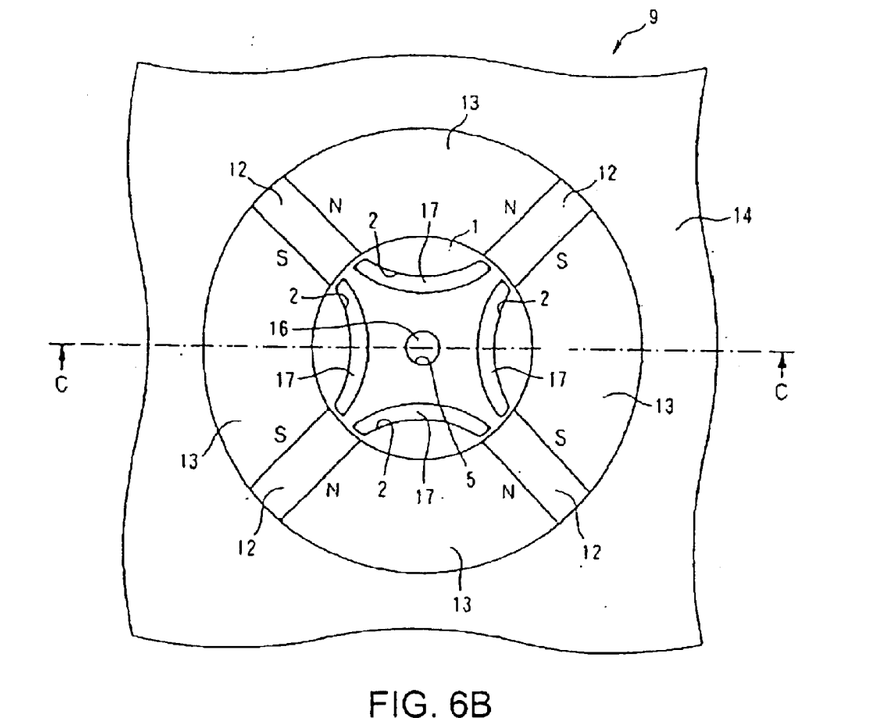
FIG. 6B is a plan view shown with the upper die removed.

FIGS. 6A and 6B illustrate an embedded magnet type rotor in accordance with a fifth embodiment of the invention, which like the first embodiment of FIGS. 2A and 2B, includes a metallic die for use in manufacturing the embedded magnet type rotor of this invention. FIG. 6A is a sectional view. FIG. 6B is a plan view with the upper die removed.

As shown in FIG. 6A, the fifth embodiment is different from the foregoing embodiments in no recessed portion is provided in the rotor core 1 or the shaft 19. Instead, the slits 2 are utilized in place of the recessed portions, and the injector pins 17 are utilized in place of the projecting portions or ribs. In particular, the injector pins 17 in FIGS.

6A and 6B are slidable in the slits 2. In the illustrated embodiment, the injector pins 17 have an outer circumferential shape selected to be substantially the same as the shape of the slits 2 so that the injector pins 17 fit within the slits 2. The full length of each injector pin 17 may have the same shape. Alternatively, the bottom portion of each injector pin 17 may have a shape different than the shape of the top portion in the slit 2.

Because of the different construction of the fifth embodiment as described above, the procedure for filling the resinous magnet 3 in the slits 2 is different from the procedure used with the foregoing embodiments. The procedure for filling the embodiment of FIGS. 6A and 6B will be described below.

First, as shown in FIG. 6B, the core pin 16 is inserted in the shaft hole 5 of the rotor core 1. The ejector pins 17 are inserted in the slits 2 of the rotor core 1 to the upper ends proximate to the gates 11. As shown in FIG. 6A, the rotor core 1 is placed in the intermediate die 9 with the ends of the arcuate slits 2 directed toward the permanent magnets 12 of the metallic mold 7. The ejector pins 17 are inserted in the slits in this way, so that rotation of the rotor core 1 can be prevented and so that alignment of the slits 2 and the gates 11 can be achieved.

After the upper die 8 is placed on the top of the intermediate die 9, the resinous magnet 3 is injected into slits 2 of the rotor core 1 from the gates 11 of the upper die 8 while being magnetically orientated by the permanent magnets 12 of the metallic mold 7. The ejector pins 17 are moved downward in response to the amount of resinous magnet injected. As the ejector pins 17 are moved downward in association with injection of the resinous magnet 3, pressure inside the slits 2 is decreased. This has the effect of drawing the resinous magnet 3 from the gates 11 of the upper die 8 so that injection pressure of the resinous magnet 3 can be kept low to prevent deformation of the slits 2. The resinous magnet 3 can be filled in the slits 2 substantially without void, resulting in a decreased rate of defective cores.

The downward movement of the ejector pins 17 is stopped with the tips of the ejector pins 17 left in the slits. After the resinous magnet 3 injected into the slits 2 has been solidified, the upper die 8 is removed from the top of the intermediate die 9. Then, the solidified resinous magnets 3 are pushed up with the ejector pins 17 to force the rotor core 1 from the intermediate die 9. In this case, since the contact areas of the ejector pins 17 with the solidified resinous magnets 3 are sufficiently large, the ejector pins 17 rarely cut into, or leave their marks on, the contact surface of the solidified resinous magnets 3.

As a result of the resinous magnet being magnetically orientated with the ejector pins 17 inserted in the slits 2, rotation of the rotor core 1 within the metallic mold 7 is prevented so that the resinous magnet 3 can be filled in the slits 2 without trouble. The resinous magnet 3 filled in the slits 2 can be magnetically orientated reliably, thus providing a decreased rate of defective cores.

While the foregoing embodiments have been shown as examples of the embedded magnet type rotor according to this invention, this invention is not intended to be limited to the illustrated rotor cores 1 or limited to the shape or the position of the fitting sections.

For example, in the foregoing embodiments, an example is shown in which a recessed portion 4 extends from one end of the core 1 to the other end thereof. Alternatively, the recessed portion may extend from one end of the rotor core 1 to the middle thereof.

Also, an example is shown in which a projection 15 is provided in the metallic mold 7 to correspond to a recess 4 provided in the rotor core 1. Alternatively, a recess may be provided on the metallic mold 7 if engageable with a projection in the rotor 1.

Further, an example is shown in which a recessed portion 4 is provided on the rotor core 1 side and a projecting portion 15 is provided on the metallic mold 7 side. Alternatively, the projecting portion may be provided on the rotor core 1 side, and the recessed portion may be provided on the metallic mold 7 side.

Furthermore, in the illustrated embodiments, anisotropic resinous magnet 3 is filled in the slits 2 of the rotor core 1 while being magnetically orientated. Alternatively, isotropic resinous magnet 3 may be filled without orientation, in which case, although no rotation force due to orientating magnetic field is produced, the resinous magnet may be used as a means of aligning the slits 2 and the gates 11 and also as a means of stopping rotation in a process of magnetization.

Further, although an example is shown in which four slits 2 are provided in the rotor core 1, one for each pole, arrangements of the foregoing embodiments are not intended to limit the number of the slits 2. It should be understood that a plurality of layers of slits may be provided.

Furthermore, although an example is shown in which slits are formed on the shape of an arc, the shape of the slits 2 is not limited, and the shape may be, for example, rectangular.

Yet further, although an embedded permanent magnet type metallic mold is used as an orientating metallic mold in the foregoing embodiments, a magnetized coil type metallic mold may be used in which orientating magnetic field is generated by electromagnets.

As described above, the embedded magnet type rotor according to the described embodiments of the invention is an embedded magnet type rotor made by a process in which resinous magnet is filled in slits provided in a rotor core. A rotor core side fitting section is engageable with a manufacturing device side fitting section provided in a manufacturing device for use in orientating or magnetizing process of the resinous magnet. Thus, the rotor core side fitting section can be engaged with the manufacturing device side fitting section to prevent rotation of the rotor core within the manufacturing device.

Also, in the filling method according to the disclosed embodiments of the invention, ejector pins are slidable along the inner surfaces of spaces to be filled. The ejector pins are inserted in the spaces to their injection mouths so that no displacement of the injection mouths is produced. The injection material can be filled in the spaces without difficulty. Further, the ejector pins can be moved in the direction of retraction in association with injection of the injection material to thereby decrease pressure inside the die to facilitate drawing the resin from the injection mouths. Thus, the injection pressure of the resin can be kept low to prevent deformation of the die. The resin can be filled in the die substantially without void, resulting in an increased filling efficiency.

What is claimed is:

1. A method for embedding magnets in a rotor core, comprising:
positioning a rotor core having a first positioning element into a die having a second positioning element, the first positioning element engaging the second positioning element to hold the rotor core in a fixed position with respect to the die, the first positioning element formed on an outside circumference of the rotor core, the second positioning element formed on an inside circumference of the die, the rotor core being positioned in the die with the first positioning element aligned with the second positioning element, the die further comprising at least one ejector pin that abuts a face of the rotor core when the rotor core is positioned in the die;

filling slits in the rotor core with resinous magnet;

applying a magnetic field to the resinous magnet in each slit to establish a magnetic orientation for the resinous magnet in each slit, the first positioning element and the second positioning element preventing the rotor core from moving under the influence of the magnetic field; and pushing on the at least one ejector pin to force the rotor core out of the die when the resinous magnet in the slits has hardened.

2. The method as defined in claim 1, wherein the first positioning element comprises at least one recess in the outer circumference of the rotor core, and wherein the second positioning element comprises at least one projection on the inner circumference of the die.

3. The method as defined in claim 2, wherein the first positioning element comprises a plurality of recesses in the outer circumference of the rotor core, and wherein the second positioning element comprises a plurality of projections on the inner surface of the die.

4. A method for embedding magnets in a rotor core, comprising:

positioning a rotor core having a first positioning element into a die having a second positioning element, the first positioning element engaging the second positioning element to hold the rotor core in a fixed position with respect to the die, the first positioning element formed on at least one face of the rotor core, the second positioning element formed on at least one surface of the die, the rotor core being positioned in the die with the at least one face of the rotor core abutting the at least one surface of the die and with the first positioning element aligned with the second positioning element, the die further comprising at least one ejector pin that abuts a face of the rotor core when the rotor core is positioned in the die;

filling slits in the rotor core with resinous magnet;

applying a magnetic field to the resinous magnet in each slit to establish a magnetic orientation for the resinous magnet in each slit, the first positioning element and the second positioning element preventing the rotor core from moving under the influence of the magnetic field; and pushing on the at least one ejector pin to force the rotor core out of the die when the resinous magnet in the slits has hardened.

5. The method as defined in claim 4, wherein the first positioning element comprises a recess in the at least one face of the rotor core, and wherein the second positioning element comprises a projection on the at least one surface of the die, the method comprising positioning the rotor core in the die with the recess aligned to receive the projection.

6. A method for embedding magnets in a rotor core, comprising:

positioning a rotor core having a first positioning element comprising a shaft hole having a keying portion into a die having a second positioning element comprising an alignment pin having a keying portion that engages keying portion of the shaft hole, the rotor core being inserted into the die with the keying portion of the shaft hole aligned with the keying portion of the alignment pin such that the first positioning element engages the second positioning element to hold the rotor core in a fixed position with respect to the die, the die further comprising at least one ejector pin that abuts a face of the rotor core when the rotor core is positioned in the die;

filling slits in the rotor core with resinous magnet;

applying a magnetic field to the resinous magnet in each slit to establish a magnetic orientation for the resinous magnet in each slit, the first positioning element and the second positioning element preventing the rotor core from moving under the influence of the magnetic field; and pushing on the at least one ejector pin to force the rotor core out of the die when the resinous magnet in the slits has hardened.

7. A method for embedding magnets in a rotor core, comprising:

positioning a rotor core having a first positioning element into a die having a second positioning element, the first positioning element engaging the second positioning element to hold the rotor core in a fixed position with respect to the die, the rotor core including a shaft having the first positioning element formed thereon, the die including a hole that receives the shaft, a portion of the hole forming the second positioning element, the rotor core being positioned in the die with the first positioning element on the shaft aligned with the second positioning element portion of the hole, the die also having at least one ejector pin that abuts a face of the rotor core when the rotor core is positioned in the die;

filling slits in the rotor core with resinous magnet;

applying a magnetic field to the resinous magnet in each slit to establish a magnetic orientation for the resinous magnet in each slit, the first positioning element and the second positioning element preventing the rotor core from moving under the influence of the magnetic field; and pushing on the at least one ejector pin to force the rotor core out of the die when the resinous magnet in the slits has hardened.

8. The method as defined in claim 7, wherein the shaft has an outer circumference and the first positioning element is a rib on the outer circumference of the shaft, the rib being in parallel with an axis of the shaft, and wherein the hole has an inner circumference and the second positioning element is a groove formed in the inner circumference of the hole and aligned with the rib when the shaft is positioned in the hole.

9. A method for embedding magnets in a rotor core, comprising:

positioning a rotor core having a first positioning element into a die having a second positioning element, the first positioning element engaging the second positioning element to hold the rotor core in a fixed position with respect to the die, the first positioning element comprising at least one of the slits of the rotor core, the second positioning element comprising at least one pin in the die, the at least one pin moveable in a direction aligned with an axis of the at least one pin, the rotor core being positioned in the die with the at least one of the slits aligned with the at least one pin, the at least one pin entering the slit to preclude movement of the rotor core in any direction other than the direction aligned with the axis of the at least one pin;

filling slits in the rotor core with resinous magnet;

extracting the pin from the slit as the slit is filled with the resinous magnet;

applying a magnetic field to the resinous magnet in each slit to establish a magnetic orientation for the resinous magnet in each slit, the first positioning element and the second positioning element preventing the rotor core from moving under the influence of the magnetic field; and using the at least one pin to push the rotor core out of the die when the resinous magnet has hardened.

10. A method for embedding magnets in a rotor core, comprising:

positioning a rotor core having a first positioning element into a die having a second positioning element, the first positioning element engaging the second positioning element to hold the rotor core in a fixed position with respect to the die, the die also having at least one ejector pin that abuts a face of the rotor core when the rotor core is positioned in the die;

filling slits in the rotor core with resinous magnet;

applying a magnetic field to the resinous magnet in each slit to establish a magnetic orientation for the resinous magnet in each slit, the first positioning element and the second positioning element preventing the rotor core from moving under the influence of the magnetic field; and pushing on the at least one ejector pin to force the rotor core out of the die when the resinous magnet in the slits has hardened.

* * * * *

UNITED STATES PATENT AND TRADEMARK OFFICE
CERTIFICATE OF CORRECTION

PATENT NO. : 6,826,824 B2
DATED : December 7, 2004
INVENTOR(S) : Hiroyuki et al.

It is certified that error appears in the above-identified patent and that said Letters Patent is hereby corrected as shown below:

Title page,
Item [54], Title, after "FILLING", please add -- METHOD --.

Signed and Sealed this

Nineteenth Day of April, 2005

JON W. DUDAS
*Director of the United States Patent and Trademark Office*